United States Patent
Beck et al.

(10) Patent No.: US 10,436,287 B2
(45) Date of Patent: Oct. 8, 2019

(54) MULTI-STAGE PLANETARY TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 748 days.

(21) Appl. No.: 14/769,568

(22) PCT Filed: Jan. 22, 2014

(86) PCT No.: PCT/EP2014/051167
§ 371 (c)(1),
(2) Date: Dec. 2, 2015

(87) PCT Pub. No.: WO2014/127944
PCT Pub. Date: Aug. 28, 2014

(65) Prior Publication Data
US 2016/0312859 A1    Oct. 27, 2016

(30) Foreign Application Priority Data
Feb. 22, 2013   (DE) .................. 10 2013 202 887

(51) Int. Cl.
*F16H 3/66* (2006.01)
*F16H 3/44* (2006.01)

(52) U.S. Cl.
CPC ......... *F16H 3/66* (2013.01); *F16H 2003/447* (2013.01); *F16H 2200/0065* (2013.01);
(Continued)

(58) Field of Classification Search
CPC ................ F16H 3/66; F16H 2200/201; F16H 2200/0065; F16H 2200/2046; F16H 2003/447
See application file for complete search history.

(56) References Cited

U.S. PATENT DOCUMENTS 7,819,772 B2   10/2010   Tenberge
9,435,404 B2 *  9/2016   Goleski .................... F16H 3/66
(Continued)

FOREIGN PATENT DOCUMENTS

| JP | 2011-017424 | 1/2011 |
| JP | 2012-127398 | 7/2012 |
| JP | 2012-127399 | 7/2012 |

OTHER PUBLICATIONS

PCT Search Report, dated May 8, 2014.
PCT Search Report and Written Opinion, dated May 8, 2014.

*Primary Examiner* — Erin D Bishop
(74) *Attorney, Agent, or Firm* — Dority & Manning, P.A.

(57) ABSTRACT

A multi speed transmission in planetary design for a vehicle, the transmission having a housing, a first shaft (1) as a drive (AN), a second shaft (2) as an output (Ab) axially parallel to the drive, three planetary gear sets (RS1, RS2, RS3), additional shafts (3-10), and six shifting elements (K1, K2, K3, K4, K5, B1) actuatable to realize several gear ratios. The transmission further includes machine elements (ST1, ST2) that transfer torque between the drive (AN) and the output (Ab). The first shaft (1) is connected to the planetary gear carrier (PT1) of the first planetary gear set (RS1) and is connectable at least to the sun gear (SR2) of the second planetary gear set (RS2) and to the ring gear (HR3) of the third planetary gear set (RS3). Additionally, the second shaft (2) is connected to the first machine element (ST1) and to the second machine element (ST2).

21 Claims, 7 Drawing Sheets

(52) U.S. Cl.
CPC ............... *F16H 2200/201* (2013.01); *F16H 2200/2046* (2013.01); *F16H 2200/2048* (2013.01)

(56) References Cited

U.S. PATENT DOCUMENTS

| | | |
|---|---|---|
| 2006/0142111 A1* | 6/2006 | Park .................... F16H 3/66 475/269 |
| 2010/0035718 A1 | 2/2010 | Saitoh |
| 2010/0311534 A1 | 12/2010 | Sugino |
| 2012/0053003 A1 | 3/2012 | Hwang |

* cited by examiner

| (gear) | (engaged shifting elements) | | | | | | (ratio) | (step) |
|---|---|---|---|---|---|---|---|---|
| | (brake) | (clutch) | | | | | | |
| | B1 | K1 | K2 | K3 | K4 | K5 | i | φ |
| G1 | X | X | X | | X | | 4.746 | 1.597 |
| G2 | X | | X | X | X | | 2.973 | 1.566 |
| G3 | | X | X | X | X | | 1.899 | 1.218 |
| G4 | | | X | X | X | X | 1.559 | 1.251 |
| G5 | X | X | | | X | X | 1.246 | 1.246 |
| G6 | | X | X | X | | X | 1.000 | 1.227 |
| G7 | X | X | X | | | X | 0.815 | 1.301 |
| G8 | X | | X | X | | X | 0.626 | 1.247 |
| G9 | X | X | | X | | X | 0.503 | (total) 9.445 |
| R | X | | X | | X | X | -3.200 | |
| M1 | | X | | X | X | X | 1.559 | |
| M2 | X | | | X | X | X | 1.559 | |
| M3 | X | X | | X | X | | 4.746 | |
| M4 | X | X | | | X | X | 4.746 | |

Fig. 5

MULTI-STAGE PLANETARY TRANSMISSION

FIELD OF THE INVENTION

The present invention relates to a multi-speed transmission in planetary design for a vehicle.

BACKGROUND

As an example, publication DE 10 2007 014 150 A1 discloses a load-shiftable multi-speed transmission. With the multi-speed transmission, the drive shaft is firmly connected through a torsional vibration damper to a first shaft of a first shaft train. A second shaft train arranged parallel to this includes, among other things, the two output shafts designated as shafts. The two shaft trains are connected to each other through three spur gear stages. A first three-shaft planetary gear stage is located on the first shaft train. A second planetary gear stage and a third planetary gear stage are located on the second shaft train. Thus, the multi-speed transmission comprises ten shafts that are connected to each other through three spur gear stages and three planetary gear stages. For shifting the eight forward gears and one reverse gear, five shifting elements are necessary. The provided shifting elements are hydraulically operated.

In order to reduce hydraulic losses, the shifting elements are to be arranged in a manner that is easily accessible from the outside. However, with a front-transverse installation of the transmission in a vehicle, only a limited axial installation space available.

SUMMARY OF THE INVENTION

The present invention is subject to a task of providing a multi-speed transmission with the highest possible number of gears and an easy accessibility of the shifting elements, with, at the same time, a good gearing efficiency and a need for axial installation space that is as low as possible. Additional objects and advantages of the invention will be set forth in part in the following description, or may be obvious from the description, or may be learned through practice of the invention.

The tasks are solved by the characteristics of the transmission embodiments set forth herein.

Accordingly, a load-shiftable multi-speed transmission in planetary design, or a multiple-gear planetary transmission for a vehicle with a housing, is proposed, whereas the drive or the drive shaft, as the case may be, and the output or the output shaft, as the case may be, are arranged in a manner that is axially parallel to each other for a preferred front-transverse installation. The multi-speed transmission in accordance with the invention comprises only ten shafts, three planetary gear sets, and only six shifting elements, in order to realize at least nine forward gears and one reverse gear. In addition, for the coupling of the drive and the output, it is preferable that only two machine elements are provided.

Given the fact that the first shaft, as a drive, is connected to the planetary gear carrier of the first planetary gear set and that the first shaft is detachably connected or connectable at least to the sun gear of the second planetary gear set and the ring gear of the third planetary gear set, and that the second shaft, as an output, is connected, or is detachably connected or connectable, to the first machine element and to the second machine element, a multi-speed transmission in accordance with the invention that enables an actuation of the shifting elements that improves the degree of efficiency and is thus in line with demand arises. The advantageously low number of transmission elements of the multi-speed transmission for a front-transverse design has its transmission elements nested with each other in such a manner that an arrangement that particularly saves axial installation space is enabled. In addition to the improved degree of efficiency, low component stresses and low construction costs arise.

The easy accessibility of the shifting elements may be realized, among other things, on the one hand through the use of brakes as shifting elements and, on the other hand, through the use of clutches as shifting elements, which are preferentially positioned at outside shafts, preferably at the drive and at the output, with the multi-stage transmission in accordance with the invention. Due to the low construction costs, in an advantageous manner, low product costs and a low weight of the multi-speed transmission in accordance with the invention arise.

Within the framework of a possible embodiment of the invention, it can be provided that, as a machine element for the coupling or for the transfer of torque between the drive and the output, at least one spur gear stage or the like, which realizes the transmission ratio for the output differential, is used. Preferably, only two machine elements or spur gear stages are provided. However, other machine elements for the transmission of power, such as chains, belts or the like, may be used.

Viewed in an axial direction, the planetary gear sets are arranged in the order of first planetary gear set, second planetary gear set, and third planetary gear set, whereas it is preferable that three negative planetary sets are provided. However, at spots where the binding ability allows it, individual or several negative planetary gear sets may be converted into positive planetary gear sets, if, at the same time, the bar connection or planetary gear carrier connection and the ring gear connection are exchanged, and the amount of the stationary transmission ratio is increased by the value of 1.

As is well-known, a negative planetary gear set features, at the planetary gear carrier, rotatably mounted planetary carriers, which mesh with the sun gear and the ring gear of such planetary gear set, such that, with a planetary gear carrier that is held down and a rotating sun gear, the ring gear rotates in a direction opposite to the direction of rotation of the sun gear.

As is well-known, a positive planetary gear set features, at its planetary gear carrier, inner and outer planetary gears that are rotatably mounted and are in a tooth meshing with each other, whereas the sun gear of such planetary gear set meshes with the inner planetary gears, and the ring gear of such planetary gear set meshes with the outer planetary gears, such that, with a planetary gear carrier that is held down and a rotating sun gear, the ring gear rotates in the same direction as the direction of rotation of the sun gear.

It is also possible that, with the multi-stage transmission in accordance with the invention, several of the planetary gear sets are arranged radially one above the other, such that they are arranged in such a manner that they are virtually nested in one another. Regardless of the type of coupling, the planetary gear sets that are nested in one another are essentially arranged in one axial plane, such that, in an advantageous manner, axial installation space is saved.

With the multi-speed transmission in accordance with the invention, a hydrodynamic torque converter or a hydrodynamic clutch can be used as the start-up element. It is also conceivable that an additional start-up clutch or an integrated start-up clutch or a start-up brake are used. Furthermore, it is possible that an electric machine or any other power source is arranged at at least one of the shafts. Moreover, at at least one of the shafts, a freewheel is arranged for the housing or for another shaft.

Preferably, with the multi-speed transmission in accordance with the invention, nine forward gears and at least one reverse gear can be shifted by means of the provided shifting elements. However, it is conceivable that, for the first forward gear and the fourth forward gear (for example), additional shifting combinations are made possible by combining other shifting elements.

Under the term "shifting element," a shiftable connection between two elements of the transmission is understood, whereas the torque to be transferred between such two elements is transferred by means of the force closure or frictional closure or by means of the form closure. If both elements of the shiftable connection are designed to rotate, the shifting element is referred to as a clutch, and if only one of the two elements of the shiftable connection rotates, the shifting element is referred to as a brake. Moreover, the geometric position and/or order of the individual shifting elements can be freely selected, as long as the binding ability of the elements allows this. In this manner, individual elements may be arbitrarily moved into any position. In addition, to the extent permitted by the external shape, several gear sets can be arranged radially above one another, thus in a nested manner.

Embodiments of a force-fitting shifting element include multi-disk clutches or brakes, band brakes, cone clutches or brakes, electromagnetic clutches, magnetic powder clutches and electro-rheological clutches. Embodiments of a positive-locking shifting element include claw clutches or brakes and tooth clutches.

Thus, in general, both frictional-locking and positive-locking shifting elements may be used as shifting elements. Preferably, given their characteristics, in particular the second shifting element designed as a clutch and the fourth shifting element designed as a clutch can be designed as claw shifting elements, by which significant consumption advantages can be achieved.

BRIEF DESCRIPTION OF THE DRAWINGS

In the following, the present invention is explained in more detail based on the drawing. The following is shown:

FIG. 5 is a shifting diagram for the various design variants of the multi-speed transmission specified above.

DETAILED DESCRIPTION

Figure 1:
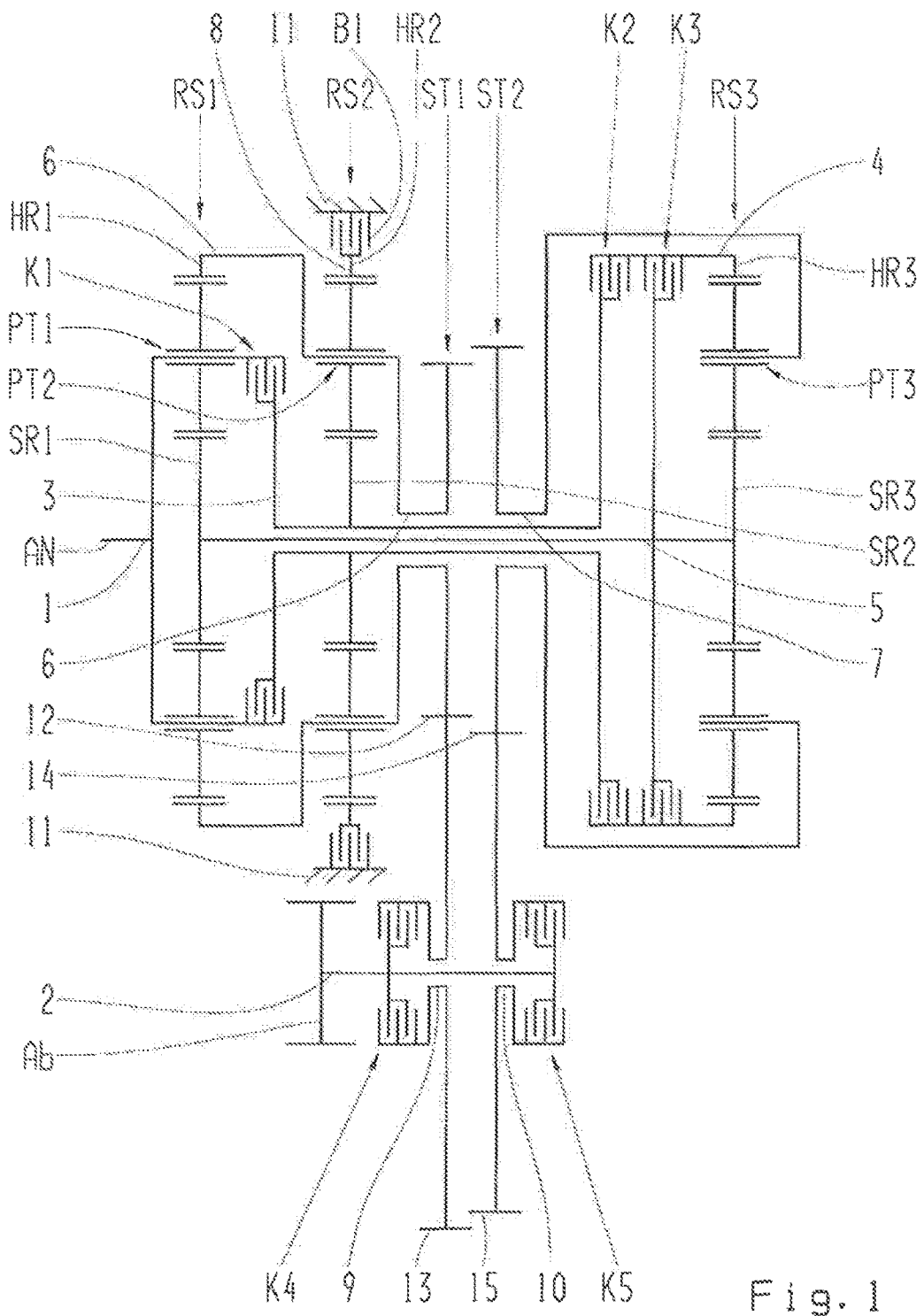
FIG. 1 is a schematic view of a first design variant of a multi-speed transmission in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Each of FIGS. 1 to 4 shows an example of a design variant of the multi-speed transmission in planetary design in accordance with the invention, for example as an automatic gearbox or automatic transmission for a vehicle, whereas FIG. 5 indicates an example of a shifting diagram for the shown design variants of the multi-speed transmission.

Regardless of the particular design variants, the multi-speed transmission comprises a merely schematically indicated housing 11, with a first shaft 1 as a drive AN and a second shaft 2 as an output Ab that is arranged in a manner axially parallel to the drive, along with eight additional shafts 3, 4, 5, 6, 7, 8, 9, 10. Furthermore, a first planetary gear set RS1, a second planetary gear set RS2, and a third planetary gear set RS3 are provided, whereas each of the first planetary gear set RS1, the second planetary gear set RS2 and the third planetary gear RS3 is preferably designed as a negative planetary gear set. For shifting several gears, a first shifting element K1 designed as a clutch, a second shifting element K2 designed as a clutch, a third shifting element K3 designed as a clutch, a fourth shifting element K4 designed as a clutch, a fifth shifting element K5 designed as a clutch, and a sixth shifting element B1 designed as a brake are provided. For the coupling or for the transfer of torque between the drive An and the output Ab, two arbitrary machine elements are preferably provided; with the design variants, these are designed, for example, as a first spur gear stage ST1 and a second spur gear stage ST2.

Figure 1A:
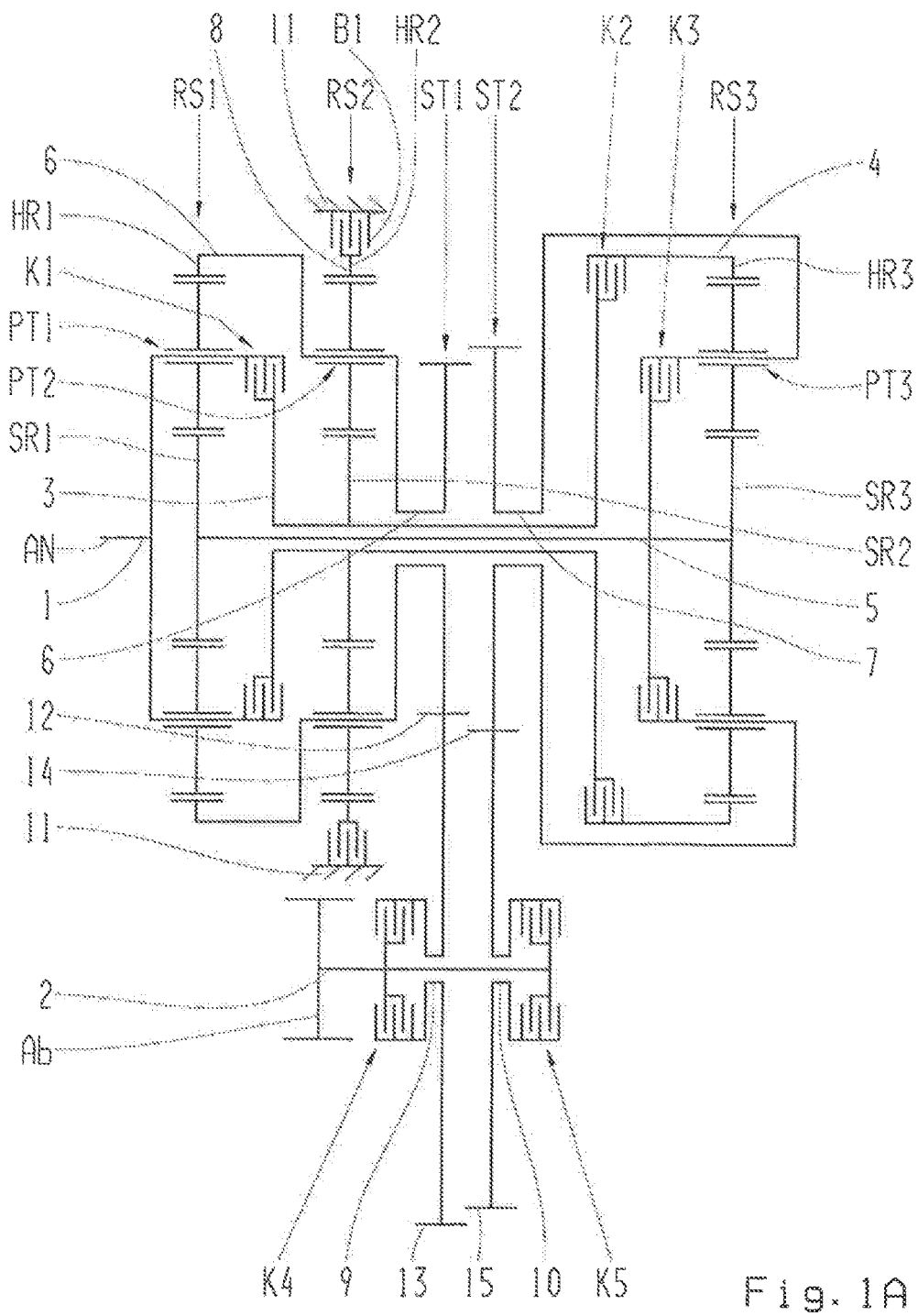
FIG. 1A is a schematic view of a first blocking variant for the first design variant in accordance with FIG. 1.
Figure 1B:
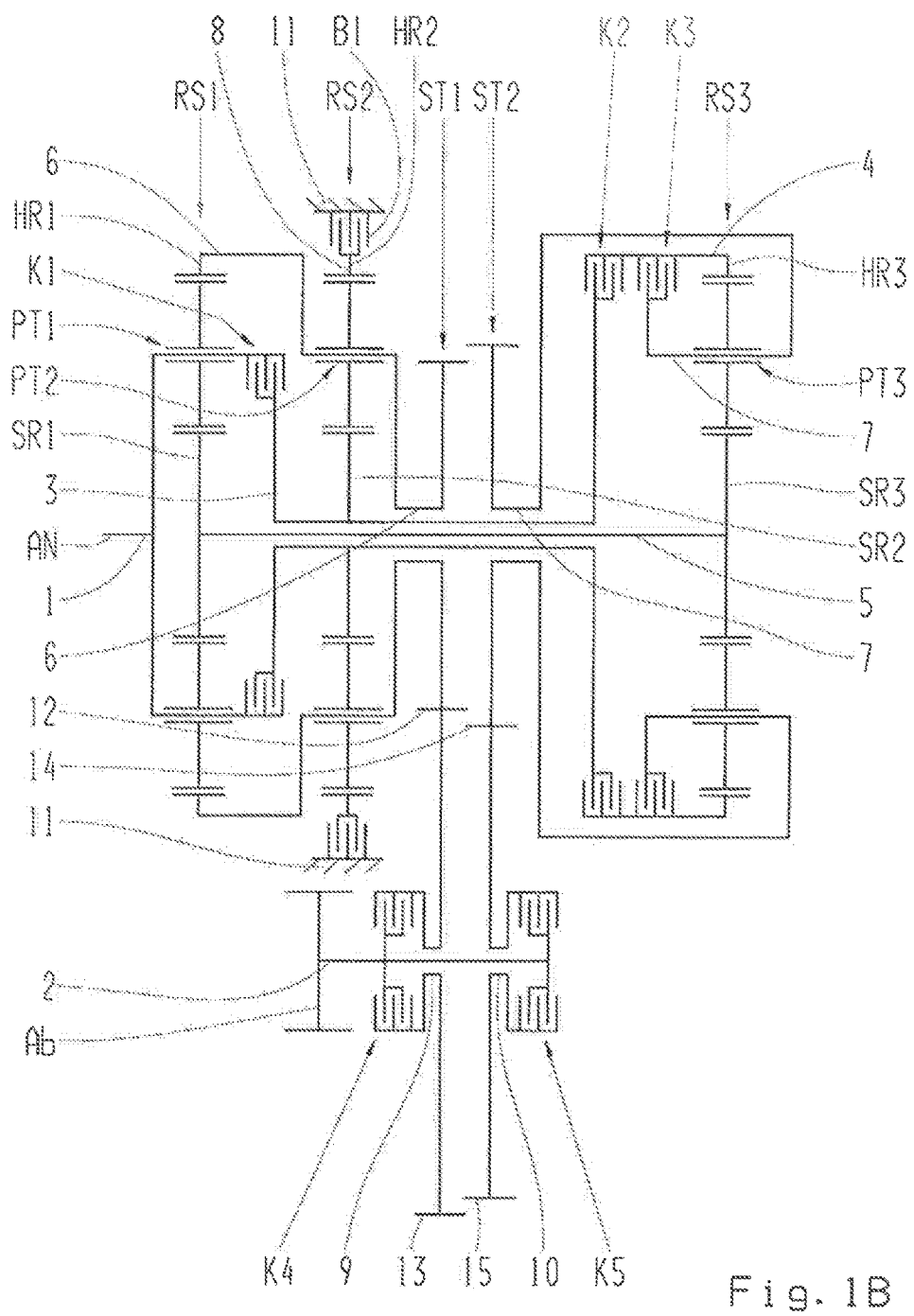
FIG. 1B is a schematic view of a second blocking variant for the first design variant in accordance with FIG. 1.
Figure 2:
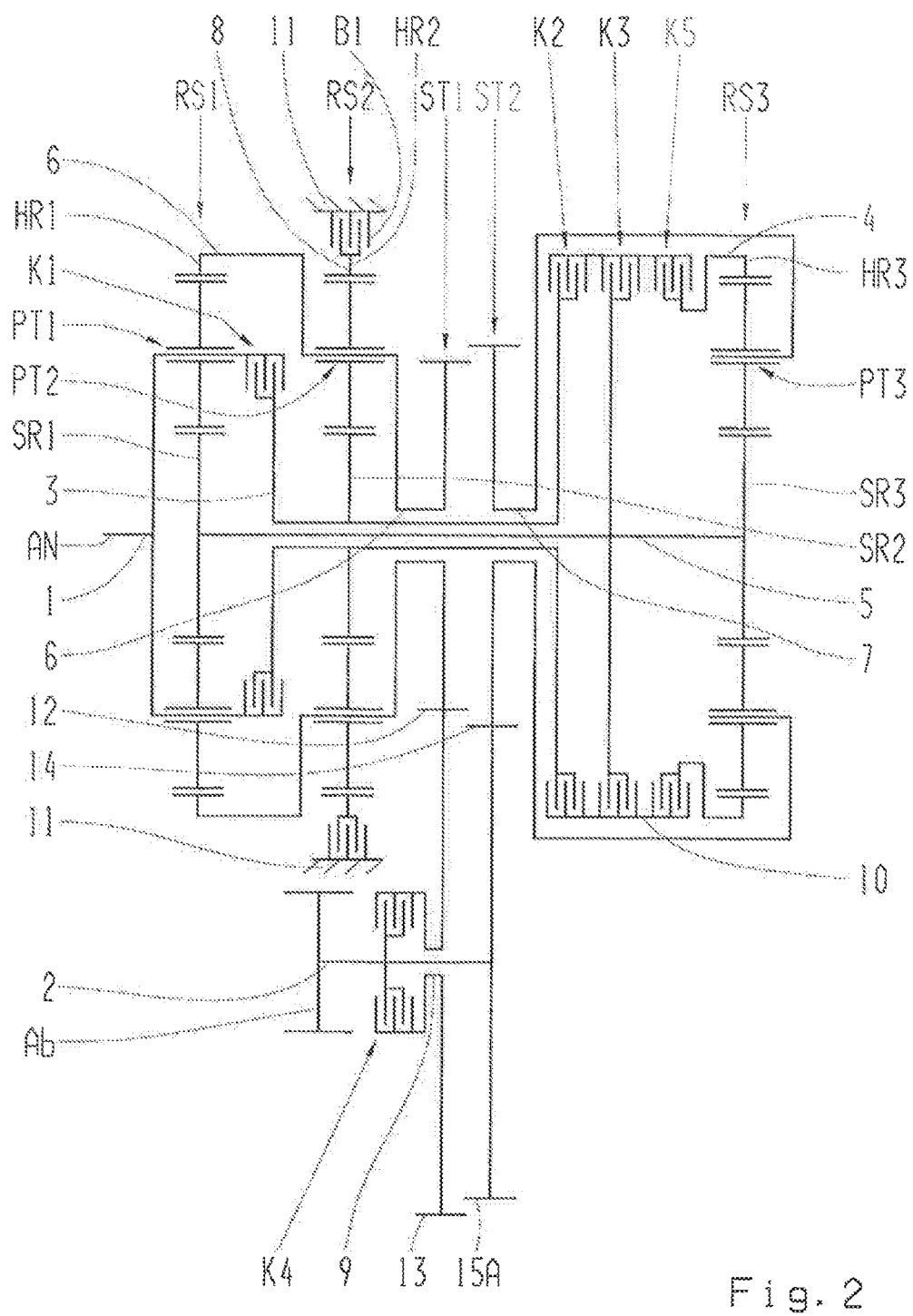
FIG. 2 is a schematic view of a second design variant of the multi-speed transmission.
Figure 3:
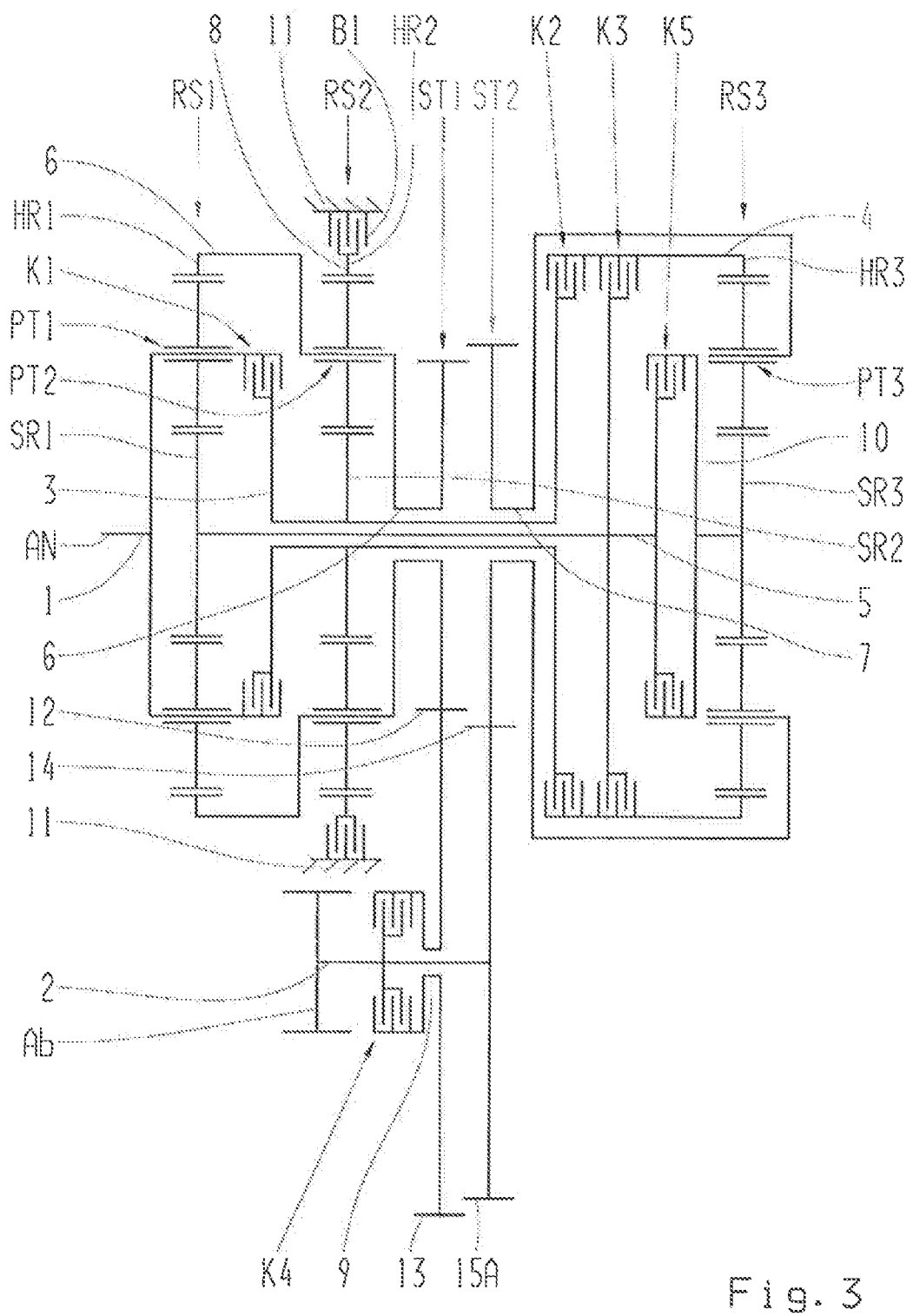
FIG. 3 is a schematic view of a third design variant of the multi-speed transmission.
Figure 4:
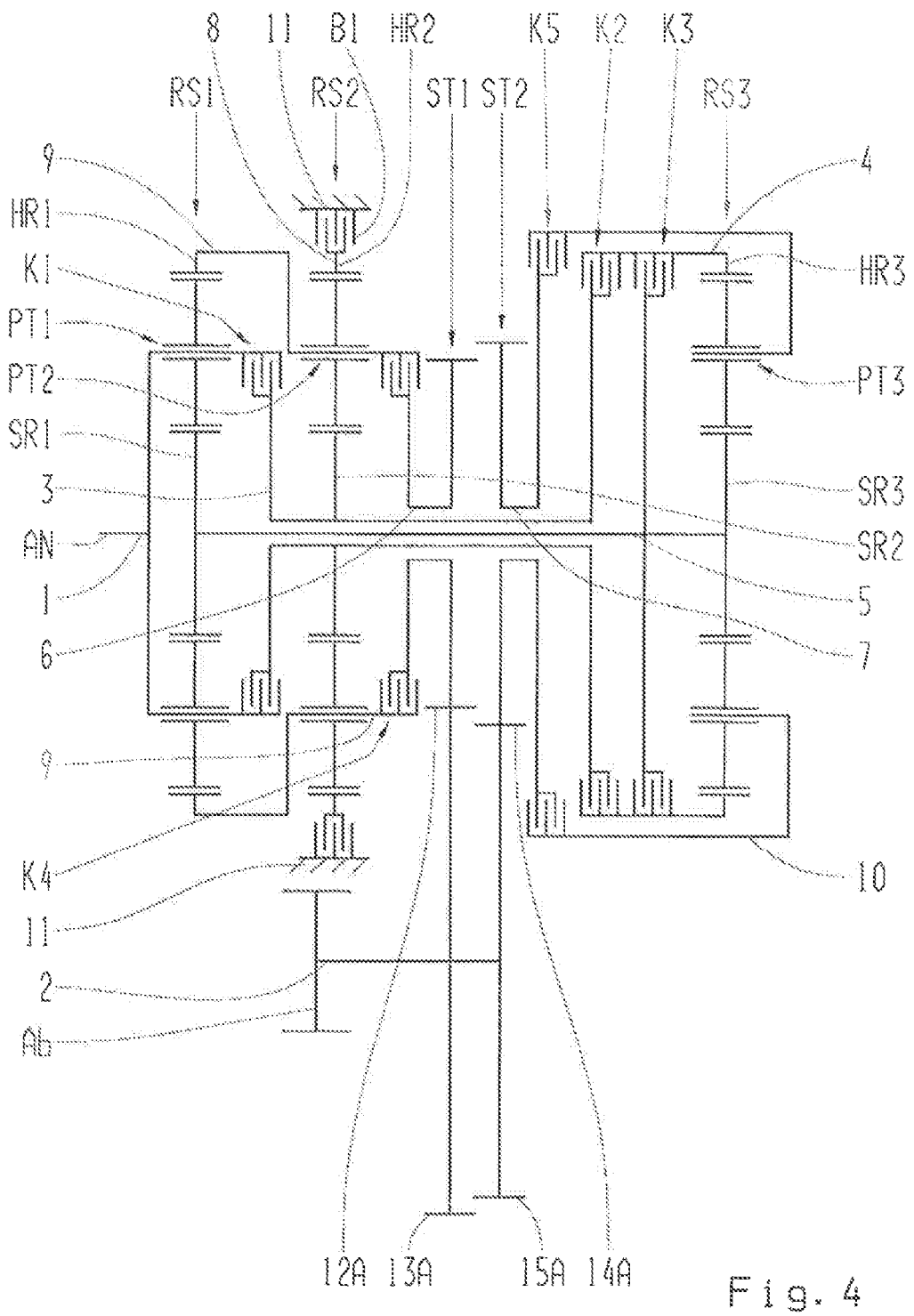
FIG. 4 is a schematic view of an alternative design of the first blocking variant in accordance with the first design variant of the multi-speed transmission.

In relation to the design variant in accordance with FIG. 1, FIGS. 2 to 4 show transmission variants with the same effect, whereas FIG. 1A shows a first blocking variant with respect to the first design variant in accordance with FIG. 1, and FIG. 1B shows a second blocking variant with respect to the first design variant in accordance with FIG. 1. FIG. 4 shows a possible variation of the first blocking variant in accordance with FIG. 1A, with which the shifting elements K4 and K5 allocated to the spur gear stages ST1 and ST2 are shifted from the output shaft or intermediate shaft, as the case may be, to the main shaft or the drive shaft, as the case may be. The different design variants in accordance with FIGS. 1 to 4 do not functionally differ from the design variants in accordance with FIG. 1 with respect to degree of efficiency, grading, etc.

With respect to the connection options between the provided shafts 1, 2, 3, 4, 5, 6, 7, 8, 9, 10, the provided three planetary gear sets RS1, RS2, RS3, the provided housing 11 and the provided shifting elements K1, K2, K3, K4, K5, B1 along with the provided spur gear stages ST1, ST2, with the term "connectable", it is to be understood that the described elements are detachable (for example, connected by a shifting element), such that the connection is locked with an activated shifting element and open with a non-activated shifting element. The detachable connection may be realized through, in addition to the shifting element, an additional element such as a shaft or the like. With the term "connected," it is to be understood that the described elements are connected to each other in a manner that is virtually fixed, thus not detachable. A direct or indirect connection (for example, through additional elements) may be realized.

In accordance with the invention, it is provided with the multi-speed transmission that the first shaft 1 is connected, as a drive, to the planetary gear carrier PT1 of the first planetary gear set RS1, that at least the first shaft 1 is detachably connected or connectable, as a drive, at least to the sun gear SR2 of the second planetary gear set RS2 and to the ring gear HR3 of the third planetary gear set RS3. The second shaft, as output shaft Ab, is detachably connected or connectable, depending on the design variant, to the first machine element, or to the first spur gear stage ST1 and to the second machine element, or to the second spur gear stage ST2, as the case may be.

With the first design variant of the multi-speed transmission in accordance with the invention, it is provided that the first shaft 1 is connected to the planetary gear carrier PT1 of the first planetary gear set RS1. Furthermore, the first shaft 1 is connectable through the first shifting element K1 designed as a clutch and through the third shaft 3 to the sun gear SR2 of the second planetary gear set RS2, whereas the third shaft 3 is connectable through the second shifting element K2 designed as a clutch and the fourth shaft 4 is connectable to the ring gear HR3 of the third planetary gear set RS3 and whereas the fourth shaft 4 is connectable through the shifting element K3 designed as a clutch and the fifth shaft 5 is connectable to the sun gear SR3 of the third planetary gear set RS3 and to the sun gear SR1 of the first planetary gear set RS1. Moreover, the second shaft 2 is connectable through the fourth shifting element K4 designed as a clutch and through the ninth shaft 9 to the idler gear 13 of the first spur gear stage ST1. Finally, the second shaft 2 is connectable through the fifth shifting element K5 designed as a clutch and through the tenth shaft 10 to the idler gear 15 of the second spur gear stage ST2.

In addition, it is provided with the first design variant that the fixed gear 12 of the first spur gear stage ST1 is connected through the sixth shaft 6 to the planetary gear carrier PT2 of the second planetary gear set RS2 and to the ring gear HR1 of the first planetary gear set RS1. Furthermore, the ring gear HR2 of the second planetary gear set RS2 is connectable through the eighth shaft 8 and through the sixth shifting element B1 designed as a brake to the housing 11. Finally, the fixed gear 14 of the second spur gear stage ST2 is connected through the seventh shaft 7 to the planetary gear carrier PT3 of the third planetary gear set RS3.

FIG. 1A shows a first blocking variant for the first design variant of the proposed multi-speed transmission shown in FIG. 1. With the variant shown in FIG. 1, for the blocking of the third planetary gear set RS3, the ring gear HR3 of the third planetary gear set RS3 is connected through the third shifting element K3 designed as a clutch and through the fifth shaft 5 to the sun gear SR3 of the third planetary gear set RS3. By contrast, with the first blocking variant in accordance with FIG. 1A, the planetary gear carrier PT3 of the third planetary gear set RS3 is connected through the third shifting element K3 designed as a clutch and through the fifth shaft 5 to the sun gear SR3 of the third planetary gear set RS3

Specifically, it is provided in the variant shown in FIG. 1A that the first shaft 1 is connected to the planetary gear carrier PT1 of the first planetary gear set RS1. In addition, the first shaft 1 is connectable through the first shifting element K1 designed as a clutch and through the third shaft 3 to the sun gear SR2 of the second planetary gear set RS2, whereas the third shaft 3 is connectable through the second shifting element K2 designed as a clutch and through the fourth shaft 4 to the ring gear HR3 of the third planetary gear set RS3. Moreover, the second shaft 2 is connectable through the fourth shifting element K4 designed as a clutch and through the ninth shaft 9 to the idler gear 13 of the first spur gear stage ST1. Finally, the second shaft 2 is connectable through the fifth shifting element K5 designed as a clutch and the tenth shaft 10 to the idler gear 15 of the second spur gear stage ST2.

In addition, it is provided with the design variant in accordance with FIG. 1A that the fixed gear 12 of the first spur gear stage ST1 is connected through the sixth shaft 6 to the planetary gear carrier PT2 of the second planetary gear set RS2 and to the ring gear HR1 of the first planetary gear set RS1. Furthermore, the ring gear HR2 of the second planetary set RS2 is connectable through the eighth shaft 8 and through the sixth shifting element B1 designed as a brake to the housing 11. Finally, the fixed gear 14 of the second spur gear stage ST2 is connected through the seventh shaft 7 to the planetary gear carrier PT3 of the third planetary gear set RS3, whereas the fixed gear 14 of the second spur gear stage ST2 and the planetary gear carrier PT3 of the third planetary gear set RS3 are connectable through the seventh shaft 7 and through the third shifting element K3 designed as a clutch and through the fifth shaft 5 to the sun gear SR1 of the first planetary gear set RS1 and to the sun gear SR3 of the third planetary gear set RS3.

FIG. 1B shows a second blocking variant with respect to the first design variant of the multi-speed transmission. With the second blocking variant, the third planetary gear set RS3 is blocked by the fact that the ring gear HR3 is connected through the third shifting element K3 designed as a clutch and through the seventh shaft 7 to the planetary gear carrier PT3 of the third planetary gear set RS3.

Specifically, it is provided with the second blocking variant that the first shaft 1 is connected to the planetary gear carrier PT1 of the first planetary gear set RS1. In addition, the first shaft 1 is connectable through the first shifting element K1 designed as a clutch and through the third shaft 3 to the sun gear SR2 of the second planetary gear set RS2, whereas the third shaft 3 is connectable through the second shifting element K2 designed as a clutch and through the fourth shaft 4 to the ring gear HR3 of the third planetary gear set RS3 and whereas the fourth shaft 4 is connectable through the third shifting element K3 designed as a clutch and through the seventh shaft 7 to the planetary gear carrier PT3 of the third planetary gear set RS3. Moreover, the second shaft 2 is connectable through the fourth shifting element K4 designed as a clutch and through the ninth shaft 9 to the idler gear 13 of the first spur gear stage ST1. Finally, the second shaft 2 is connectable through the fifth shifting element K5 designed as a clutch and the tenth shaft 10 to the idler gear 15 of the second spur gear stage ST2.

Furthermore, it is provided with the second blocking variant that the fixed gear 12 of the first spur gear stage ST1 is connected through the sixth shaft 6 to the planetary gear carrier PT2 of the second planetary gear set RS2 and to the ring gear HR1 of the first planetary gear set RS1. Moreover, the ring gear HR2 of the second planetary gear set RS2 is connectable through the eighth shaft 8 and through the sixth shifting element B1 designed as a brake to the housing 11. Furthermore, the fixed gear 14 of the second spur gear stage ST2 is connected through the seventh shaft 7 to the planetary gear carrier PT3 of the third planetary gear set RS3. Finally, the sun gear SR1 of the first planetary gear set RS1 is connected through the fifth shaft 5 to the sun gear SR3 of the third planetary gear set RS3.

With the second design variant of the multi-speed transmission shown in FIG. 2, it is provided that the first shaft 1 is connected to the planetary gear carrier PT1 of the first planetary gear set RS1. Moreover, the first shaft 1 is connectable through the first shifting element K1 designed as a clutch and through the third shaft 3 to the sun gear SR2 of the second planetary gear set RS2, whereas the third shaft 3 is connectable through the second shifting element K2 designed as a clutch and through the tenth shaft 10, and through the fifth shifting element K5 designed as a clutch and through the fourth shaft 4, to the ring gear HR3 of the third planetary gear set RS3, and whereas the tenth shaft 10 is connectable through the third shifting element K3 designed as a clutch and through the fifth shaft 5 to the sun gear SR1 of the first planetary gear set RS1 and the sun gear SRmine3 of the third planetary gear set RS3. In addition, the second shaft 2 is connectable through the fourth shifting element K4 designed as a clutch and through the ninth shaft 9 to the idler gear 13 of the first spur gear stage ST1. Finally, the second shaft 2 is connected to the fixed gear 15A of the second spur gear stage ST2.

Furthermore, it is provided with the second design variant that the fixed gear 12 of the first spur gear stage ST1 is connected through the sixth shaft 6 to the planetary gear carrier PT2 of the second planetary gear set RS2 and to the ring gear HR1 of the first planetary gear set RS1. In addition, the ring gear HR2 of the second planetary gear set RS2 is connectable through the eighth shaft 8 and through the sixth shifting element B1 designed as a brake to the housing 11. Finally, the fixed gear 14 of the second spur gear stage ST2 is connected through the seventh shaft 7 to the planetary gear carrier PT3 of the third planetary gear set RS3.

With the third design variant shown in FIG. 3, it is provided that the first shaft 1 is connected to the planetary gear carrier PT1 of the first planetary gear set RS1. In addition, the first shaft 1 is connectable through the first shifting element K1 designed as a clutch and through the third shaft 3 to the sun gear SR2 of the second planetary gear set RS2, whereas the third shaft 3 is connectable through the second shifting element K2 designed as a clutch and through the fourth shaft 4 to the ring gear HR3 of the third planetary gear set RS3, whereas the fourth shaft 4 is connected through the third shifting element K3 designed as a clutch and through the fifth shaft 5 to the sun gear SR1 of the first planetary gear set RS1 and whereas the fifth shaft 5 is connectable through the fifth shifting element K5 designed as a clutch and through the tenth shaft 10 to the sun gear SR3 of the third planetary gear set RS3. Moreover, the second shaft 2 is connectable through the fourth shifting element K4 designed as a clutch and through the ninth shaft 9 to the idler gear 13 of the first spur gear stage ST1. Finally, the second shaft 2 is connected to the fixed gear 15A of the second spur gear stage ST2.

With the third design variant, it is further provided that the fixed gear 12 of the first spur gear stage ST1 is connected through the sixth shaft 6 to the planetary gear carrier PT2 of the second planetary gear set RS2 and to the ring gear HR1 of the first planetary gear set RS1. Moreover, the ring gear HR2 of the second planetary gear set RS2 is connectable through the eighth shaft 8 and through the sixth shifting element B1 designed as a brake to the housing 11. Finally, the fixed gear 14 of the second spur gear stage ST2 is connected through the seventh shaft 7 to the planetary gear carrier PT3 of the third planetary gear set RS3.

The design presented in FIG. 4 shows a possible variation in accordance with the first blocking variant corresponding to FIG. 1 A in which the shifting elements K4 and K5 allocated to the output Ab, thus the second shaft 2 or the intermediate shaft, as the case may be, are allocated to the main shaft, thus the drive An or the first shaft 1, as the case may be. Specifically, it is provided with this design that the first shaft 1 is connected to the planetary gear carrier PT1 of the first planetary gear set RS1. In addition, the first shaft 1 is connectable through the first shifting element K1 designed as a clutch and through the third shaft 3 to the sun gear SR2 of the second planetary gear set RS2, whereas the third shaft 3 is connectable through the second shifting element K2 designed as a clutch and through the tenth shaft 10 to the ring gear HR3 of the third planetary gear set RS3 and whereas the tenth shaft 10 is connectable through the third shifting element K3 designed as a clutch and the fifth shaft 5 to the sun gear SR1 of the first planetary gear set RS1 and to the sun gear SR3 of the third planetary gear set RS3. Furthermore, the second shaft 2 is connected to the fixed gear 13A of the first spur gear stage ST1. Finally, the second shaft 2 is connected to the fixed gear 15A of the second spur gear stage ST2.

Moreover, it is provided with the design in accordance with FIG. 4 that the idler gear 12A of the first spur gear stage ST1 is connectable through the sixth shaft 6 and through the fourth shifting element K4 designed as a clutch and through the ninth shaft 9 to the planetary gear carrier PT2 of the second planetary gear set RS2 and to the ring gear HR1 of the first planetary gear set RS1. In addition, the ring gear HR2 of the second planetary gear set RS2 is connectable through the eighth shaft 8 and through the sixth shifting element B1 designed as a brake to the housing 11. Finally, the idler gear 14A of the second spur gear stage ST2 is connectable through the seventh shaft 7 and through the fifth shifting element K5 designed as a clutch and through the tenth shaft 10 to the planetary gear carrier PT3 of the third planetary gear set RS3.

For the presented equally effective design variants or designs, FIG. 5 shows an example of a shifting diagram or a shifting matrix, as the case may be, for the transmission variants. In the shifting diagram, for the realization of the various gears, shifting elements K1, K2, K3, K4, K5, B1 to be locked or activated, as the case may be, are shown in table form, whereas a transmission ratio i is indicated for each gear and the respective gear jump φ is indicated between different gears. In addition to the nine forward gears G1, G2, G3, G4, G5, G6, G7, G8, G9 and the specified reverse gear R, additional shifting combinations M1, M2, M3, M4, for example, are indicated as alternative first forward gears or as alternative fourth forward gears G4.

On the whole, it also arises from the shifting diagram that the proposed multi-speed transmission features optimized transmission ratio sequences with low absolute and relative rotational speeds and low torques for the planetary gear sets and shifting elements. In addition, good degrees of toothing efficiency and low drag torques arise from the selected arrangements of the gear sets.

As preferred stationary transmission ratios, a value of approximately i0=−1.500 can be used for the first planetary gear set RS1, a value of approximately i0=−1.500 can for the second planetary gear set RS2, a value of approximately i0=−2.967 can be used for the third planetary gear set RS3. As the stationary transmission ratio, a value of approximately iST1=−1.898 is selected for the first spur gear stage ST1, and a value of approximately iST2=−1.000 is selected for the second spur gear stage ST2. Moreover, it arises from the shifting diagram that, for shifting gears, each of the four shifting elements is locked.

Specifically, it arises from the shifting diagram in accordance with FIG. 5 that, for the realization of the first forward gear G1, the first shifting element K1 designed as a clutch, the second shifting element K2 designed as a clutch, the fourth shifting element K4 designed as a clutch and the sixth shifting element B1 designed as a brake are locked. For the shifting of the second forward gear G2, the second shifting element K2 designed as a clutch, the third shifting element K3 designed as a clutch, the fourth shifting element K4 designed as a clutch and the sixth shifting element B1 designed as a brake are locked. For the shifting of the third forward gear G3, the first shifting element K1 designed as a clutch, the second shifting element K2 designed as a clutch, the third shifting element K3 designed as a clutch and the fourth shifting element K4 designed as a clutch are locked. For the shifting of the fourth forward gear G4, the second shifting element K2 designed as a clutch, the third shifting element K3 designed as a clutch, the fourth shifting element K4 designed as a clutch and the fifth shifting element K5 designed as a clutch are locked. For the shifting of the fifth forward gear G5, the first shifting element K1 designed as a clutch, the second shifting element K2 designed as a clutch, the fourth shifting element K4 designed as a clutch and the fifth shifting element K5 designed as a clutch are locked. For the shifting of the sixth forward gear G6, the first shifting element K1 designed as a clutch, the second shifting element K2 designed as a clutch, the third shifting element K3 designed as a clutch and the fifth shifting element K5 designed as a clutch are locked. For the shifting of the seventh forward gear G7, the first shifting element K1 designed as a clutch, the second shifting element K2 designed as a clutch, the fifth shifting element K5 designed as a clutch and the sixth shifting element B1 designed as a brake are locked. For the shifting of the eighth forward gear G8, the second shifting element K2 designed as a clutch, the third shifting element K3 designed as a clutch, the fifth shifting element K5 designed as a clutch and the sixth shifting element B1 designed as a brake are locked. For the shifting of the ninth forward gear G9, the first shifting element K1 designed as a clutch, the third shifting element K3 designed as a clutch, the fifth shifting element K5 designed as a clutch and the sixth shifting element B1 designed as a brake are locked. Finally, for the shifting of the reverse gear R, the second shifting element K2 designed as a clutch, the fourth shifting element K4 designed as a clutch, the fifth shifting element K5 designed as a clutch and the sixth shifting element B1 designed as a brake are locked.

With respect to the additional shifting combinations M1 and M2, for example, it is provided for the fourth forward gear G4 that, for the shifting of the first alternative shifting combination M1, the first shifting element K1 designed as a clutch, the third shifting element K3 designed as a clutch, the fourth shifting element K4 designed as a clutch and the fifth shifting element K5 designed as a clutch are locked. For the shifting of the second alternative shifting combination M2, it is provided that the third shifting element K3 designed as a clutch, the fourth shifting element K4 designed as a clutch, the fifth shifting element K5 designed as a clutch and the sixth shifting element B1 designed as a brake are locked.

With respect to the additional shifting combinations M3 and M4, for example, it is provided for the first forward gear G1 that, for the shifting of the third alternative shifting combination M3, the first shifting element K1 designed as a clutch, the third shifting element K3 designed as a clutch, the fourth shifting element K4 designed as a clutch and sixth shifting element B1 designed as a brake are locked. For the shifting of the fourth alternative shifting combination M4, it is provided that the first shifting element K1 designed as a clutch, the fourth shifting element K4 designed as a clutch, the fifth shifting element K5 designed as a clutch and the sixth shifting element B1 designed as a brake are locked.

Modifications and variations can be made to the embodiments illustrated or described herein without departing from the scope and spirit of the invention as set forth in the appended claims.

REFERENCE SIGNS

1 First shaft as a drive
2 Second shaft as an output
3 Third shaft
4 Fourth shaft
5 Fifth shaft
6 Sixth shaft
7 Seventh shaft
8 Eighth shaft
9 Ninth shaft
10 Tenth shaft
11 Housing
K1 First shifting element as a clutch
K2 Second shifting element as a clutch
K3 Third shifting element as a clutch
K4 Fourth shifting element as a clutch
K5 Fifth shifting element as a clutch
B1 Sixth shifting element as a brake
RS1 First planetary gear set
RS2 Second planetary gear set
RS3 Third planetary gear set
SR1 Sun gear of the first planetary gear set
PT1 Planetary gear carrier of the first planetary gear set
HR1 Ring gear of the first planetary gear set
SR2 Sun gear of the second planetary gear set
PT2 Planetary gear carrier of the second planetary gear set
HR2 Ring gear of the second planetary gear set
SR3 Sun gear of the third planetary gear set
PT3 Planetary gear carrier of the third planetary gear set
HR3 Ring gear of the third planetary gear set
ST1 First spur gear stage
ST2 Second spur gear stage
12 Fixed gear of the first spur gear stage
12A Idler gear of the first spur gear stage
13 Idler gear of the first spur gear stage
13A Fixed gear of the first spur gear stage
14 Fixed gear of the second spur gear stage
14A Idler gear of the second spur gear stage
15A Fixed gear of the second spur gear stage
15 Idler gear of the second spur gear stage
G1 First forward gear
G2 Second forward gear
G3 Third forward gear
G4 Fourth forward gear
G5 Fifth forward gear
G6 Sixth forward gear
G7 Seventh forward gear
G8 Eighth forward gear
G9 Ninth forward gear
R Reverse gear
M1 Alternative fourth gear
M2 Alternative fourth gear
M3 Alternative first gear
M4 Alternative first gear
i Transmission ratio
$i_0$ Stationary transmission ratios of the planetary gear sets
$I_{ST1}$ Stationary transmission ratio of the first spur gear stage
$I_{ST2}$ Stationary transmission ratio of the second spur gear stage
φ Gear jump

The invention claimed is:

1. A multi-speed transmission of planetary design for a vehicle, comprising:
   a housing (11);
   an input shaft (1) provided as a drive (AN);
   a second shaft (2) provided as an output (Ab) that is axially parallel to the drive (AN);
   first, second, and third planetary gear sets (RS1, RS2, RS3);
   third, fourth, fifth, sixth, seventh, eighth, ninth, and tenth shafts (3, 4, 5, 6, 7, 8, 9, 10);
   first, second, third, fourth, fifth, and sixth shifting elements (K1, K2, K3, K4, K5, B1) through actuation of which a plurality of gear ratios is realized; and
   first and second machine elements (ST1, ST2) that transfer torque between the drive (AN) and the output (Ab);
   wherein the input shaft (1) is directly connected to a planetary gear carrier (PT1) of the first planetary gear set (RS1), and the input shaft (1) is directly connectable to a sun gear (SR2) of the second planetary gear set (RS2) and to a ring gear (HR3) of the third planetary gear set (RS3),
   wherein the second shaft (2) is connectable or connected to the first machine element (ST1) and to the second machine element (ST2), and
   wherein the first and second machine elements are one of spur gear stages (ST1, ST2) or chains.

2. The multi-speed transmission according to claim 1, wherein:
   the input shaft (1) is connectable through the first shifting element (K1) and through the third shaft (3) to the sun gear (SR2) of the second planetary gear set (RS2);
   the third shaft (3) is connectable through the second shifting element (K2) and through the fourth shaft (4) to the ring gear (HR3) of the third planetary gear set (RS3);
   the fourth shaft (4) is connectable through the third shifting element (K3) and through the fifth shaft (5) to a sun gear (SR3) of the third planetary gear set (RS3) and to a sun gear (SR1) of the first planetary gear set (RS1);
   the first and second machine elements are spur gear stages (ST1, ST2);
   the second shaft (2) is connectable through the fourth shifting element (K4) and through the ninth shaft (9) to an idler gear (13) of the first spur gear stage (ST1);
   the second shaft (2) is connectable through the fifth shifting element (K5) and through the tenth shaft (10) to an idler gear (15) of the second spur gear stage (ST2); and
   each of the first, second, third, fourth, and fifth shifting elements (K1, K2, K3, K4, K5) is a clutch.

3. The multi-speed transmission according to claim 2, wherein:
   a fixed gear (12) of the first spur gear stage (ST1) is connected through the sixth shaft (6) to a planetary gear carrier (PT2) of the second planetary gear set (RS2) and to a ring gear (HR1) of the first planetary gear set (RS1);
   the ring gear (HR2) of the second planetary gear set (RS2) is connectable through the eighth shaft (8) and through the sixth shifting element (B1) to the housing (11);
   a fixed gear (14) of the second spur gear stage (ST2) is connected through the seventh shaft (7) to a planetary gear carrier (PT3) of the third planetary gear set (RS3); and
   the sixth shifting element (B1) is a brake.

4. The multi-speed transmission according to claim 1, wherein:
   the input shaft (1) is connectable through the first shifting element (K1) and through the third shaft (3) to the sun gear (SR2) of the second planetary gear set (RS2);
   the third shaft (3) is connectable through the second shifting element (K2) and through the fourth shaft (4) to the ring gear (HR3) of the third planetary gear set (RS3);
   the first and second machine elements are spur gear stages (ST1, ST2);
   the second shaft (2) is connectable through the fourth shifting element (K4) and through the ninth shaft (9) to an idler gear (13) of the first spur gear stage (ST1);
   the second shaft (2) is connectable through the fifth shifting element (K5) and the tenth shaft (10) to an idler gear (15) of the second spur gear stage (ST2); and
   each of the first, second, fourth, and fifth shifting elements (K1, K2, K4, K5) is a clutch.

5. The multi-speed transmission according to claim 4, wherein:
   a fixed gear (12) of the first spur gear stage (ST1) is connected through the sixth shaft (6) to a planetary gear carrier (PT2) of the second planetary gear set (RS2) and a ring gear (HR1) of the first planetary gear set (RS1);
   a ring gear (HR2) of the second planetary set (RS2) is connectable through the eighth shaft (8) and through the sixth shifting element (B1) to the housing (11);
   a fixed gear (14) of the second spur gear stage (ST2) is connected through the seventh shaft (7) to a planetary gear carrier (PT3) of the third planetary gear set (RS3); and
   the fixed gear (14) of the second spur gear stage (ST2) and the planetary gear carrier (PT3) of the third planetary gear set (RS3) are connectable through the seventh shaft (7), through the third shifting element (K3), and through the fifth shaft (5) to a sun gear (SR1) of the first planetary gear set (RS1) and to a sun gear (SR3) of the third planetary gear set (RS3); and
   the sixth shifting element (B1) is a brake and the third shifting element (K3) is a clutch.

6. The multi-speed transmission according to claim 1, wherein:
   the input shaft (1) is connectable through the first shifting element (K1) and through the third shaft (3) to the sun gear (SR2) of the second planetary gear set (RS2);
   the third shaft (3) is connectable through the second shifting element (K2) and through the fourth shaft (4) to the ring gear (HR3) of the third planetary gear set (RS3);
   the fourth shaft (4) is connectable through the third shifting element (K3) and through the seventh shaft (7) to a planetary gear carrier (PT3) of the third planetary gear set (RS3);
   the first and second machine elements are spur gear stages (ST1, ST2);
   the second shaft (2) is connectable through the fourth shifting element (K4) and through the ninth shaft (9) to an idler gear (13) of the first spur gear stage (ST1);
   the second shaft (2) is connectable through the fifth shifting element (K5) and the tenth shaft (10) to an idler gear (15) of the second spur gear stage (ST2); and
   each of the first, second, third, fourth, and fifth shifting elements (K1, K2, K3, K4, K5) is a clutch.

7. The multi-speed transmission according to claim 6, wherein:

a fixed gear (12) of the first spur gear stage (ST1) is connected through the sixth shaft (6) to a planetary gear carrier (PT2) of the second planetary gear set (RS2) and to a ring gear (HR1) of the first planetary gear set (RS1);
a ring gear (HR2) of the second planetary gear set (RS2) is connectable through the eighth shaft (8) and through the sixth shifting element (B1) to the housing (11);
a fixed gear (14) of the second spur gear stage (ST2) is connected through the seventh shaft (7) to the planetary gear carrier (PT3) of the third planetary gear set (RS3);
a sun gear (SR1) of the first planetary gear set (RS1) is connected through the fifth shaft (5) to a sun gear (SR3) of the third planetary gear set (RS3); and
the sixth shifting element (B1) is a brake.

8. The multi-speed transmission according to claim 1, wherein:
the input shaft (1) is connectable through the first shifting element (K1) and through the third shaft (3) to the sun gear (SR2) of the second planetary gear set (RS2);
the third shaft (3) is connectable through the second shifting element (K2), through the tenth shaft (10), through the fifth shifting element (K5), and through the fourth shaft (4) to the ring gear (HR3) of the third planetary gear set (RS3);
the tenth shaft (10) is connectable through the third shifting element (K3) and through the fifth shaft (5) to a sun gear (SR1) of the first planetary gear set (RS1) and to a sun gear (SR3) of the third planetary gear set (RS3);
the first and second machine elements are spur gear stages (ST1, ST2);
the second shaft (2) is connectable through the fourth shifting element (K4) and through the ninth shaft (9) to an idler gear (13) of the first spur gear stage (ST1);
the second shaft (2) is connected to a fixed gear (15A) of the second spur gear stage (ST2); and
each of the first second, third, fourth, and fifth shifting elements (K1, K2, K3, K4, K5) is a clutch.

9. The multi-speed transmission according to claim 8, wherein:
a fixed gear (12) of the first spur gear stage (ST1) is connected through the sixth shaft (6) to a planetary gear carrier (PT2) of the second planetary gear set (RS2) and to a ring gear (HR1) of the first planetary gear set (RS1);
a ring gear (HR2) of the second planetary gear set (RS2) is connectable through the eighth shaft (8) and through the sixth shifting element (B1) to the housing (11);
a second fixed gear (14) of the second spur gear stage (ST2) is connected through the seventh shaft (7) to a planetary gear carrier (PT3) of the third planetary gear set (RS3); and
the sixth shifting element (B1) is a brake.

10. The multi-speed transmission according to claim 1, wherein:
the input shaft (1) is connectable through the first shifting element (K1) and through the third shaft (3) to the sun gear (SR2) of the second planetary gear set (RS2);
the third shaft (3) is connectable through the second shifting element (K2) and through the fourth shaft (4) to the ring gear (HR3) of the third planetary gear set (RS3);
the fourth shaft (4) is connected through the third shifting element (K3) and through the fifth shaft (5) to a sun gear (SR1) of the first planetary gear set (RS1);

the fifth shaft (5) is connectable through the fifth shifting element (K5) and through the tenth shaft (10) to a sun gear (SR3) of the third planetary gear set (RS3);
the first and second machine elements are spur gear stages (ST1, ST2);
the second shaft (2) is connectable through the fourth shifting element (K4) and through the ninth shaft (9) to an idler gear (13) of the first spur gear stage (ST1);
the second shaft (2) is connected to a fixed gear (15A) of the second spur gear stage (ST2), and
each of the first, second, third, fourth, and fifth shifting elements (K1, K2, K3, K4, K5) is a clutch.

11. The multi-speed transmission according to claim 10, wherein:
a fixed gear (12) of the first spur gear stage (ST1) is connected through the sixth shaft (6) to a planetary gear carrier (PT2) of the second planetary gear set (RS2) and to a ring gear (HR1) of the first planetary gear set (RS1);
a ring gear (HR2) of the second planetary gear set (RS2) is connectable through the eighth shaft (8) and through the sixth shifting element (B1) to the housing (11);
a second fixed gear (14) of the second spur gear stage (ST2) is connected through the seventh shaft (7) to a planetary gear carrier (PT3) of the third planetary gear set (RS3), and
the sixth shifting element is a brake.

12. The multi-speed transmission according to claim 1, wherein:
the input shaft (1) is connectable through the first shifting element (K1) and through the third shaft (3) to the sun gear (SR2) of the second planetary gear set (RS2);
the third shaft (3) is connectable through the second shifting element (K2) and through the tenth shaft (10) to the ring gear (HR3) of the third planetary gear set (RS3);
the tenth shaft (10) is connectable through the third shifting element (K3) and the fifth shaft (5) to a sun gear (SR1) of the first planetary gear set (RS1) and to a sun gear (SR3) of the third planetary gear set (RS3);
the first and second machine elements are spur gear stages (ST1, ST2);
the second shaft (2) is connected to a fixed gear (13A) of the first spur gear stage (ST1);
the second shaft (2) is connected to a fixed gear (15A) of the second spur gear stage (ST2); and
each of the first, second, and third shifting elements (K1, K2, K3) is a clutch.

13. The multi-speed transmission according to claim 12, wherein:
an idler gear (12A) of the first spur gear stage (ST1) is connectable through the sixth shaft (6) and through the fourth shifting element (K4) and through the ninth shaft (9) to a planetary gear carrier (PT2) of the second planetary gear set (RS2) and to a ring gear (HR1) of the first planetary gear set (RS1);
the ring gear (HR2) of the second planetary gear set (RS2) is connectable through the eighth shaft (8) and through the sixth shifting element (B1) to the housing (11);
an idler gear (14A) of the second spur gear stage (ST2) is connectable through the seventh shaft (7), through the fifth shifting element (K5), and through the tenth shaft (10) to a planetary gear carrier (PT3) of the third planetary gear set (RS3); and
each of the fourth and fifth shifting elements (K4, K5) is a clutch and the sixth shifting element (B1) is a brake.

14. The multi-speed transmission according to claim 1, wherein the plurality of gear ratios comprises first, second, third, fourth, fifth, sixth, seventh, eighth, and ninth shiftable forward gear ratios (G1 to G9) and a reverse gear ratio (R).

15. The multi-speed transmission according to claim 14, wherein each of the first, second, third, fourth, and fifth shifting elements (K1, K2, K3, K4, K5) is a clutch, and the sixth shifting element (B1) is a brake and is a frictional-locking or a positive-locking shifting element.

16. The multi-speed transmission according to claim 14, wherein:
- for shifting of the first forward gear ratio (G1), the first shifting element (K1), the second shifting element (K2), the fourth shifting element (K4), and the sixth shifting element (B1) are locked;
- for shifting of the second forward gear ratio (G2), the second shifting element (K2), the third shifting element (K3), the fourth shifting element (K4), and the sixth shifting element (B1) are locked;
- for shifting of the third forward gear ratio (G3), the first shifting element (K1), the second shifting element (K2), the third shifting element (K3), and the fourth shifting element (K4) are locked;
- for shifting of the fifth forward gear ratio (G5), the first shifting element (K1), the second shifting element (K2), the fourth shifting element (K4), and the fifth shifting element (K5) are locked;
- for shifting of the sixth forward gear ratio (G6), the first shifting element (K1), the second shifting element (K2), the third shifting element (K3), and the fifth shifting element (K5) are locked;
- for shifting of the seventh forward gear ratio (G7), the first shifting element (K1), the second shifting element (K2), the fifth shifting element (K5), and the sixth shifting element (B1) are locked;
- for shifting of the eighth forward gear ratio (G8), the second shifting element (K2), the third shifting element (K3), the fifth shifting element (K5), and the sixth shifting element (B1) are locked;
- for shifting of the ninth forward gear ratio (G9), the first shifting element (K1), the third shifting element (K3), the fifth shifting element (K5), and the sixth shifting element (B1) are locked; and
- for shifting of the reverse gear ratio (R), the second shifting element (K2), the fourth shifting element (K4), the fifth shifting element (K5), and the sixth shifting element (B1) are locked.

17. The multi-speed transmission according to claim 16, wherein for shifting of the fourth forward gear ratio (G4), the second shifting element (K2), the third shifting element (K3), the fourth shifting element (K4), and the fifth shifting element (K5) are locked.

18. The multi-speed transmission according to claim 16, wherein for shifting of the fourth forward gear ratio (G4), the third shifting element (K3), the fourth shifting element (K4), the fifth shifting element (K5), and the sixth shifting element (B1) are locked.

19. The multi-speed transmission according to claim 16, wherein for shifting of the fourth forward gear ratio (G4), the first shifting element (K1), the third shifting element (K3), the fourth shifting element (K4), and the fifth shifting element (K5) are locked.

20. The multi-speed transmission according to claim 1, wherein the multi-speed transmission has only ten shafts, namely the input, second, third, fourth, fifth, sixth, seventh, eighth, ninth, and tenth shafts (1, 2, 3, 4, 5, 6, 7, 8, 9, 10).

21. The multi-speed transmission according to claim 1, wherein the input shaft (1) is directly connectable to the sun gear (SR2) of the second planetary gear set (RS2) and to the ring gear (HR3) of the third planetary gear set (RS3) such that the input shaft (1), the sun gear (SR2) of the second planetary gear set (RS2), and the ring gear (HR3) of the third planetary gear set (RS3) rotate at the same rotational speed when operatively connected.

* * * * *